US007572073B2

(12) United States Patent  
Kenoyer et al.

(10) Patent No.: US 7,572,073 B2  
(45) Date of Patent: Aug. 11, 2009

(54) CAMERA SUPPORT MECHANISM

(75) Inventors: Michael L. Kenoyer, Austin, TX (US); Jonathan I. Kaplan, Palo Alto, CA (US); Paul D. Frey, San Francisco, CA (US); Paul Leslie Howard, Aptos, CA (US); Branko Lukic, Menlo Park, CA (US)

(73) Assignee: LifeSize Communications, Inc., Austin, TX (US)

( * ) Notice: Subject to any disclaimer, the term of this patent is extended or adjusted under 35 U.S.C. 154(b) by 53 days.

(21) Appl. No.: 11/252,222

(22) Filed: Oct. 17, 2005

(65) Prior Publication Data

US 2006/0088308 A1 Apr. 27, 2006

Related U.S. Application Data

(60) Provisional application No. 60/619,227, filed on Oct. 15, 2004, provisional application No. 60/675,964, filed on Apr. 29, 2005.

(51) Int. Cl.
*G03B 17/00* (2006.01)
*H04N 5/225* (2006.01)
*A47B 91/00* (2006.01)

(52) U.S. Cl. .................... 396/428; 348/373; 248/187.1; 248/188.8

(58) Field of Classification Search ............... 396/428, 396/419, 424, 425, 427; 348/373, 375, 376, 348/207.99, 14.01, 14.16, 211.12, 207.1; 248/187.1, 178.1, 188, 188.1, 188.3, 188.6, 248/188.8, 205.6, 213, 689, 124.2, 154, 231.4, 248/166, 121, 126, 918, 229.12, 912
See application file for complete search history.

(56) References Cited

U.S. PATENT DOCUMENTS

| | | | |
|---|---|---|---|
| 4,264,928 | A | 4/1981 | Schober |
| 5,322,255 | A | 6/1994 | Garrett |
| 5,374,971 | A | 12/1994 | Clapp et al. |
| 5,486,853 | A | 1/1996 | Baxter et al. |
| 5,515,099 | A | 5/1996 | Cortjens et al. |
| 5,528,289 | A | 6/1996 | Cortjens et al. |
| 5,537,157 | A | 7/1996 | Washino et al. |
| 5,598,209 | A | 1/1997 | Cortjens et al. |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner*—Rochelle-Ann J Blackman
(74) *Attorney, Agent, or Firm*—Meyertons Hood Kivlin Kowert & Goetzel, P.C.; Jeffrey C. Hood

(57) ABSTRACT

In some embodiments, a camera support mechanism may be used as a mount to couple a camera to a display. The camera support mechanism may include a front lip and rear leg to hold the camera in place. The front lip may align with a front edge of a display. In some embodiments, the rear leg may be adjustable by an adjustment knob. The rear leg may further have a compliant tip to allow the camera support mechanism to adapt to different sizes and shapes of displays. The camera may be mounted on the camera support mechanism through a fastener.

20 Claims, 8 Drawing Sheets

U.S. PATENT DOCUMENTS

| | | | |
|---|---|---|---|
| 5,612,733 | A | 3/1997 | Flohr |
| 5,617,539 | A | 4/1997 | Ludwig et al. |
| 5,633,681 | A | 5/1997 | Baxter et al. |
| 5,689,641 | A | 11/1997 | Ludwig et al. |
| 5,692,159 | A | 11/1997 | Shand |
| 5,751,338 | A | 5/1998 | Ludwig, Jr. |
| 5,821,987 | A | 10/1998 | Larson |
| 5,855,343 | A * | 1/1999 | Krekelberg .................. 248/121 |
| 6,072,522 | A | 6/2000 | Ippolito et al. |
| 6,239,841 | B1 | 5/2001 | Verstockt et al. |
| 6,356,308 | B1 | 3/2002 | Hovanky |
| 6,431,507 | B2 * | 8/2002 | Prather et al. ................ 248/166 |
| 6,481,681 | B1 * | 11/2002 | Stunkel et al. ......... 248/231.31 |
| 6,594,688 | B2 | 7/2003 | Ludwig et al. |
| 6,643,462 | B2 | 11/2003 | Harand et al. |
| 6,663,066 | B1 * | 12/2003 | Hong .................... 248/231.41 |
| 6,679,463 | B1 * | 1/2004 | Chen .......................... 248/126 |
| 6,724,619 | B2 | 4/2004 | Kwong et al. |
| 6,731,334 | B1 | 5/2004 | Maeng et al. |
| 6,731,340 | B1 | 5/2004 | Lai |
| 6,738,094 | B1 * | 5/2004 | Minami et al. .............. 348/373 |
| 6,809,358 | B2 | 10/2004 | Hsieh et al. |
| 6,816,904 | B1 | 11/2004 | Ludwig et al. |
| 6,845,954 | B1 * | 1/2005 | Moayer et al. ........... 248/187.1 |
| 6,850,265 | B1 | 2/2005 | Strubbe et al. |
| 6,970,202 | B1 | 11/2005 | Glogan et al. |
| 6,980,485 | B2 | 12/2005 | McCaskill |
| 7,038,709 | B1 | 5/2006 | Verghese |
| 7,046,295 | B2 | 5/2006 | Hovanky |
| 7,048,454 | B2 | 5/2006 | Sitoh et al. |
| 7,066,664 | B1 | 6/2006 | Sitoh et al. |
| 7,202,903 | B2 * | 4/2007 | Lin et al. .................... 348/373 |
| 7,202,904 | B2 | 4/2007 | Wei |
| 7,219,866 | B2 * | 5/2007 | Depay et al. ........... 248/229.22 |
| 2004/0001137 | A1 | 1/2004 | Cutler et al. |
| 2004/0130655 | A1 * | 7/2004 | Yanakawa et al. ........... 348/373 |
| 2004/0183897 | A1 | 9/2004 | Kenoyer et al. |
| 2005/0265712 | A1 * | 12/2005 | Sitoh et al. .................. 396/428 |
| 2006/0170817 | A1 * | 8/2006 | Wu ............................ 348/373 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

Peter Meyers; "Adding Eye Contact to Your Web Chats"; The New York Times; Sep. 4, 2003; 5 pages.

"Polycom Executive Collection"; Jun. 2003; 4 pages; Polycom, Inc.; Pleasanton, CA.

* cited by examiner

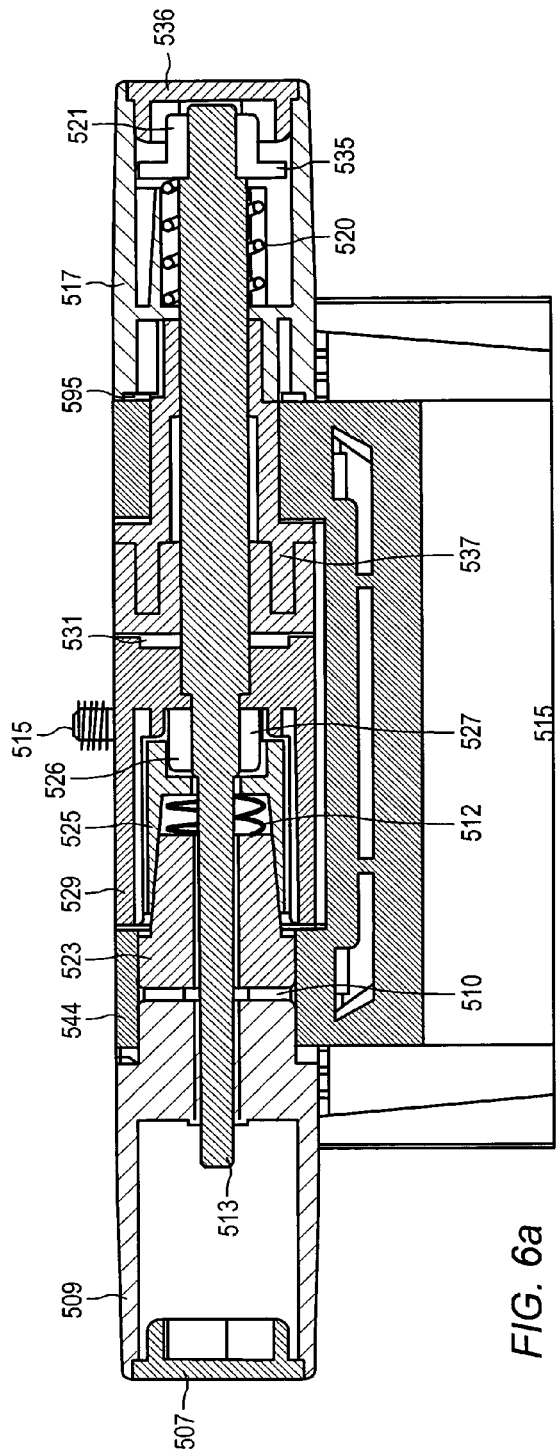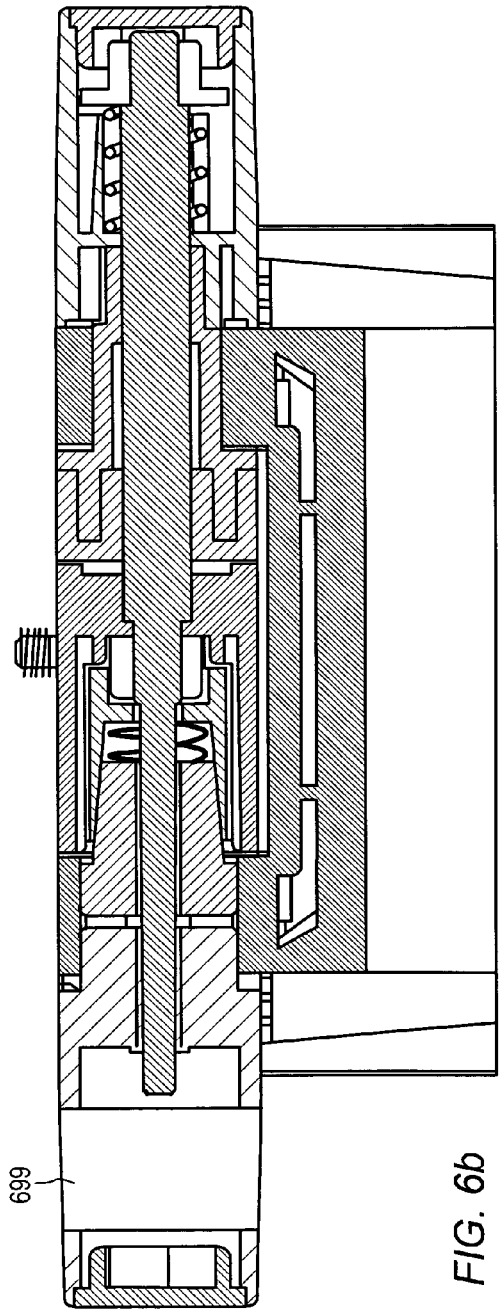
FIG. 6a
FIG. 6b

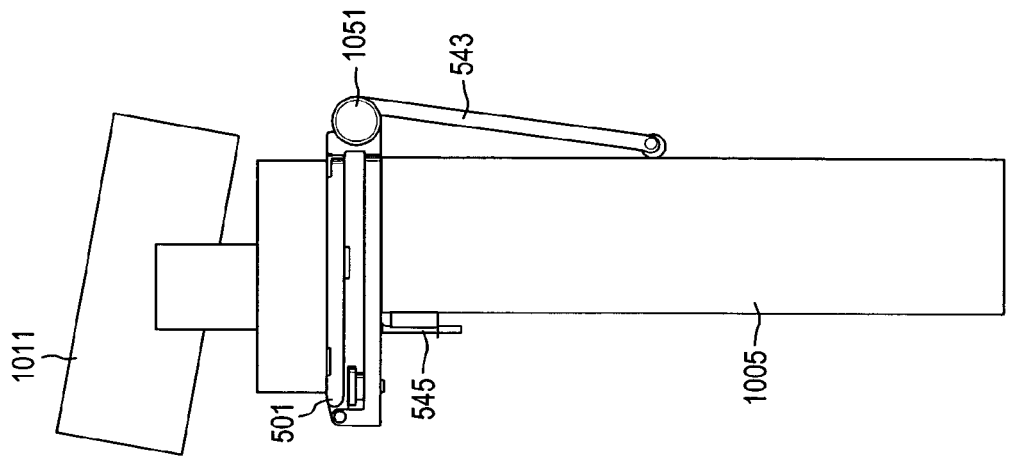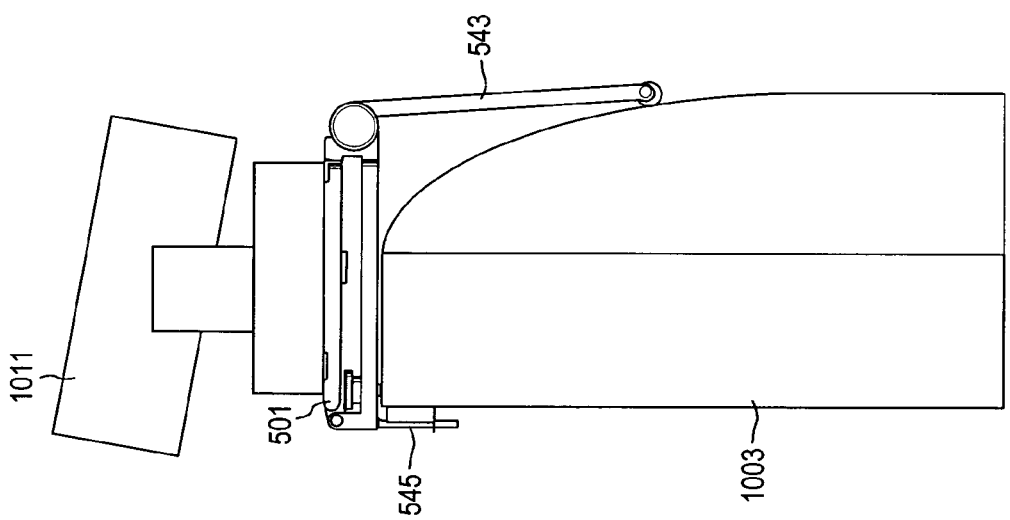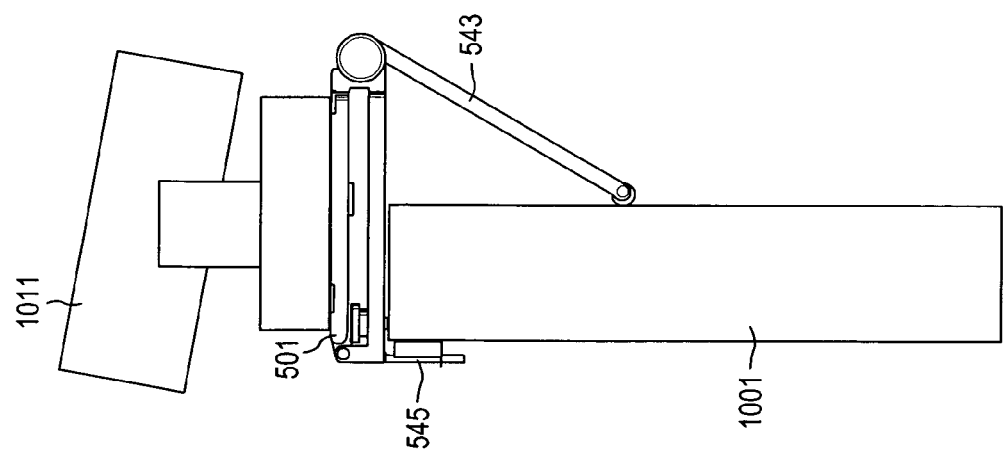

CAMERA SUPPORT MECHANISM

PRIORITY

This application claims priority to U.S. Provisional Patent Application Ser. No. 60/619,227 titled "High Definition Camera and Mount", which was filed Oct. 15, 2004, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

This application also claims priority to U.S. Provisional Patent Application Ser. No. 60/675,964 titled "Camera Support Mechanism", which was filed Apr. 29, 2005, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

BACKGROUND OF THE INVENTION

1. Field of the Invention

The present invention relates generally to mounts and, more specifically, to camera mounts.

2. Description of the Related Art

Video conferencing systems for video conference calls have traditionally been of the set-top box format. The Polycom ViewStation and Tandberg 880 are two examples. These may be in the range of 13-17" wide by 8-10" deep and 6-10" high. These set-top systems may be placed on a top surface of a display device (e.g., a cathode ray tube (CRT) based television). A camera in the video conferencing system may acquire video of the local participants during the video call to send to the remote conference sites. The local display device may in turn display video of the remote participants during the video call.

As large screen (32"-65") HiDef televisions have become more popular, the television industry has been transitioning away from CRT based devices and moving toward plasma and liquid crystal displays (LCD) screens, which allow the display to be much thinner. Current plasma and LCD televisions may be as thin as 3-4".

The top and back surfaces of the displays may not have a consistent shape or depth making it very difficult to place a camera on top of the display without it being very unstable and likely to fall off. One solution is to install a shelf above the display and place the camera on the shelf. However, that may mean the system cannot be moved around and may need to be permanently installed close to a wall that may be needed to mount the shelf.

SUMMARY OF THE INVENTION

In various embodiments, a camera support mechanism (CSM) may be used to couple a camera to a display. In some embodiments, the CSM may have a flat top that folds open to access a tripod mount screw capable of coupling the camera to the CSM. After attaching the camera to the top of the CSM, the CSM may be placed on the top of the display device (e.g., in the center). The CSM may have an adjustable front lip that aligns to the top front edge of the display device. In some embodiments, the front lip may be attached to a lower deck through a mount screw. The front lip may have two separate offsets that may cushion the contact with the display. In some embodiments, the CSM may work with display devices that have either a concave or a convex front and/or back surface. The front lip may be adjusted to one of a number of set positions so that the CSM can accommodate even extremely thin screens that may be wall mounted.

In some embodiments, when the CSM is placed on the display, a user may tighten an adjustment knob on one side of the rear leg securing assembly at the rear of the CSM. This may rotate the adjustable rear leg towards the back of the display. In some embodiments, the rear leg may rotate until it contacts the rear of the display. When the rear leg has rotated to the point where it makes contact with the display, further tightening of the adjustment knobs may apply additional pressure. The rear leg may be tightened to lock the rear leg firmly against the back of the display at that position. In some embodiments, the rear leg may have a foam/rubber tip for better gripping. In some embodiments, the adjustable rear leg and compliant tip may allow the CSM to accommodate variable slope on the display from front to back. In some embodiments, the upper deck of the CSM may be adjustable through an adjustment knob to adjust the slant of the camera relative to the display.

BRIEF DESCRIPTION OF THE DRAWINGS

A better understanding of the present invention may be obtained when the following detailed description is considered in conjunction with the following drawings, in which:

FIGS. 6a and 6b illustrate cross sectional views of an embodiment of the camera support mechanism with an adjustment knob (6a) and a motor (6b), according to an embodiment;

FIGS. 10a-10c illustrate various configurations for the camera support mechanism on different display types, according to an embodiment.

Figure 1:
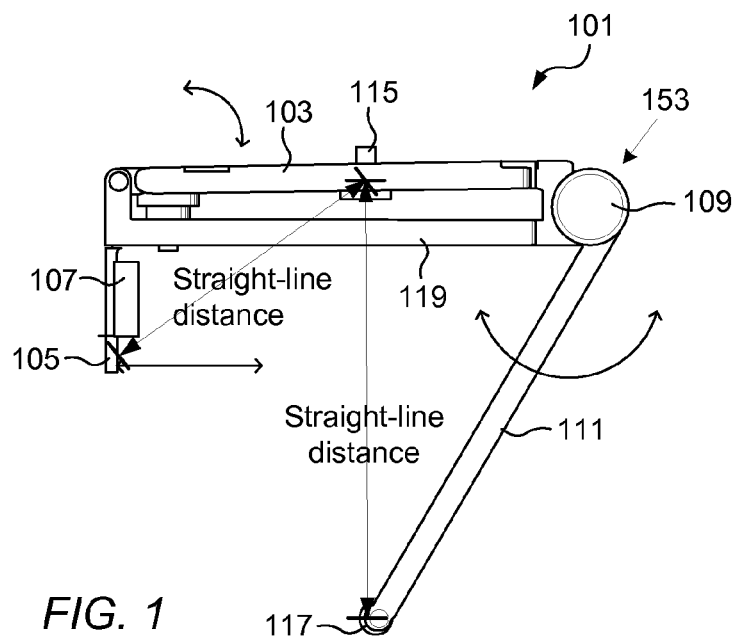
FIG. 1 illustrates a side view of the camera support mechanism, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Provisional Patent Application titled "Speakerphone", Ser. No. 60/619,303, which was filed Oct. 15, 2004, whose inventors are William V. Oxford, Michael L. Kenoyer, and Simon Dudley is hereby incorporated by reference in its entirety as though fully and completely set forth herein.

U.S. Provisional Patent Application titled "Speakerphone", Ser. No. 60/634,315 which was filed Dec. 8, 2004, whose inventors are William V. Oxford, Michael L. Kenoyer and Simon Dudley which is hereby incorporated by reference in its entirety as though fully and completely set forth herein.

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application titled "Video Conference Call System", Ser. No. 60/619,210, which was filed Oct. 15, 2004, whose inventors are Jonathan W. Tracey, Craig B. Malloy, Michael L. Kenoyer, Michael V. Jenkins, Ashish Goyal, and Michael J. Burkett, is hereby incorporated by reference in its entirety as though fully and completely set forth herein.

Figure 2:
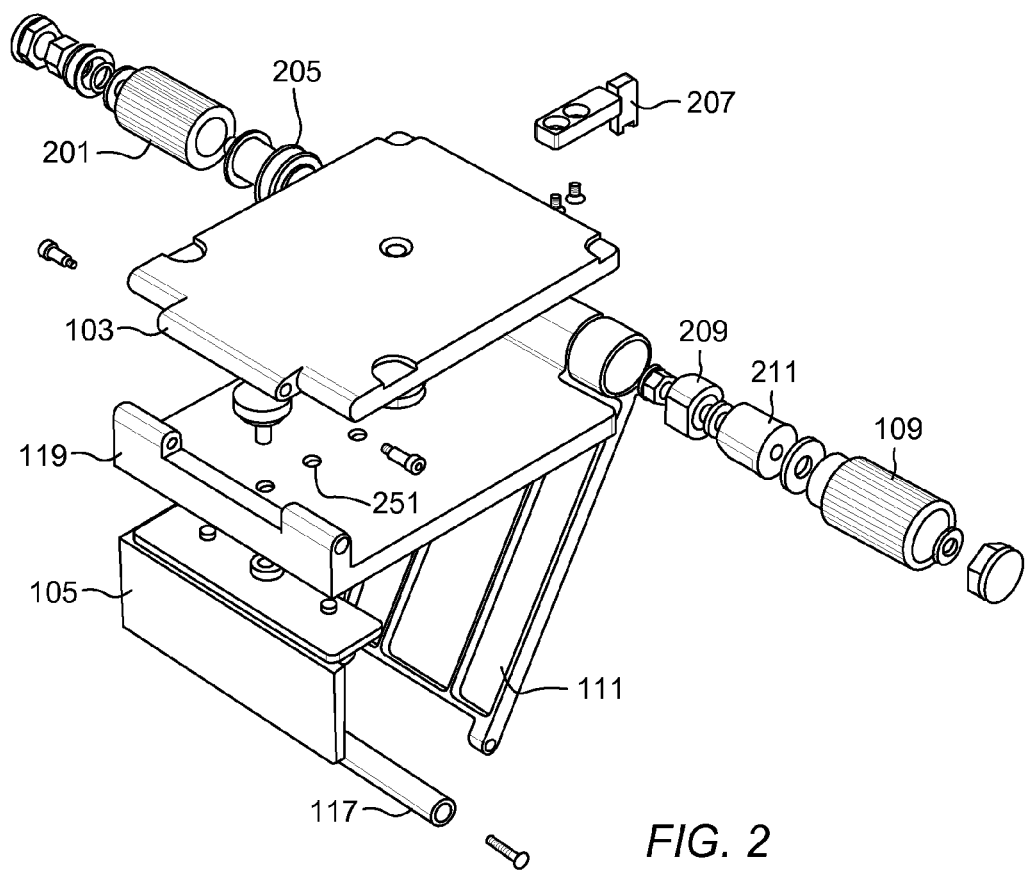
FIG. 2 illustrates an exploded view of the camera support mechanism, according to an embodiment.

As seen in FIGS. 1 and 2, in various embodiments, a camera support mechanism (CSM) 101 may be used as a mount to mount a camera on top of a display (e.g., a computer monitor or High Definition (HD) television). The CSM 101 may be used with a HD video conferencing pan-tilt-zoom camera, or may be used for mounting any object on top of another object with a variable shape and thickness. This could be adapted, for example, to place a Digital Versatile Disc (DVD) player and/or a satellite receiver on top of the display.

In various embodiments, the CSM 101 may have an upper deck 103 (which may be flat) that folds open to access a tripod mount screw 115 that couples the camera to the CSM 101. Other fasteners may also be used to couple the camera to the CSM 101. In some embodiments, the CSM may not have a flat top that folds open. After attaching the camera to the top of the CSM 101, the CSM 101 may be placed on the top of the display device (e.g., in the center). In some embodiments, the CSM 101 may have an adjustable front lip 105 that abuts (i.e., contacts for alignment to and/or is substantially flush with) the top front edge of the display device. Other adjustment ranges are also contemplated. The adjustable front lip 105 may be adjusted to engage a front of the display. In some embodiments, the front lip may be fixed relative to the CSM 101 (i.e., not be adjustable). In some embodiments, the front lip 105 may be long enough to fit over the front part of a curved monitor.

In some embodiments, the front lip 105 may be attached to the lower deck 119 through a mount screw 203. Other fasteners between the front lip 105 and the lower deck 119 are also contemplated. In some embodiments, the front lip 105 may be attached to the lower deck 119 without a fastener. In some embodiments, the front lip 105 may have a foam rubber pad 107. In some embodiments, the front lip 105 may have two separate pads that may cushion the contact with the display. Other numbers, shapes, and materials for the offsets are also contemplated. In some embodiments, multiple pads 107 may be used to engage the CSM 101 with display devices that have either a concave or a convex front surface. In some embodiments, the CSM 101 may also work with display devices that have either a concave or a convex surface if only a single pad is used. The front lip 105 may be adjusted to one of a number of set positions (as determined by the mounting screw holes 251 in the lower deck 119) so that the CSM 101 can accommodate even extremely thin screens that may be wall mounted. In some embodiments, a slot may be used instead of mounting screw holes 251. For thin display devices mounted to a wall, the CSM 101 and camera may actually extend a couple of inches in front of the display in order for the back of the CSM 101 to not make contact with the wall. In some embodiments, the CSM may make contact with the wall. For example, in some embodiments, the CSM may be mounted to the wall.

In some embodiments, when the CSM 101 is placed on the display, a user may tighten adjustment knob 109 on one side of the pivot assembly 153 at the rear of the CSM 101. In some embodiments, the adjustment knob 109 may be a large knurled plastic knob. Other materials and shapes for the adjustment knob 109 are also contemplated. In some embodiments, a motor may be used in place of or in addition to the adjustment knob to adjust the adjustable rear leg 111. Tightening the adjustment knob 109 may rotate the adjustable rear leg 111 towards the back of the display. In some embodiments, the rear leg 111 may rotate from flat and parallel to the top of the display to perpendicular to the top of the display. In some embodiments, the rear leg 111 may accommodate different shaped displays (e.g., monitor based displays, rear-projection LCD displays, and plasma screens). When the rear leg 111 has rotated to the point where it makes contact with the display, further tightening of the adjustment knobs 109 may apply additional pressure. In some embodiments, the rear leg 111 may be tightened to lock the rear leg 111 firmly against the back of the display at that position. In some embodiments, the lower deck face gear 209 and leg face gear 211 may be used to move and/or tighten the rear leg 111.

In some embodiments, the two face gears 209, 211 may disengage to allow the rear leg 111 to swing against the back of the display. Then the face gears 209, 211 may engage to lock the rear leg 111 in one position. In some embodiments, conical mating surfaces may be used in place of face gears 209, 211. For example, conical mating surfaces (similar to a conical clutch) may be used to allow continuous stopping positions for the rear leg 111. In some embodiments, discrete stopping positions may be used. In some embodiments, the rear leg 111 may have a compliant tip (e.g., comprised of foam/rubber) 117 for better gripping. In some embodiments, the CSM 101 may accommodate variable slope on the display from front to back using the compliant tip 117.

In some embodiments, with the CSM 101 firmly attached to the display, the camera may be relatively flat but may not be perfectly lined up with the top of the display device resulting in a tilt offset. By turning the lifter knob 201 (as seen in FIG. 2) on the CSM 101, the angle of the camera may be adjusted up or down approximately in a range of plus or minus 10 degrees (other ranges are also contemplated). The lifter knob 201 may interact with a lifter cam 205 to elevate or lower the upper deck 103 to adjust the angle of the camera. In some embodiments, the lifter knob 201 may be made of knurled plastic. Other materials and shapes are also contemplated. In some embodiments, the upper deck 103 may be pivotably coupled to the lower deck 119 on the opposing side of the lower deck 119 than the adjustment knobs.

Figure 3:
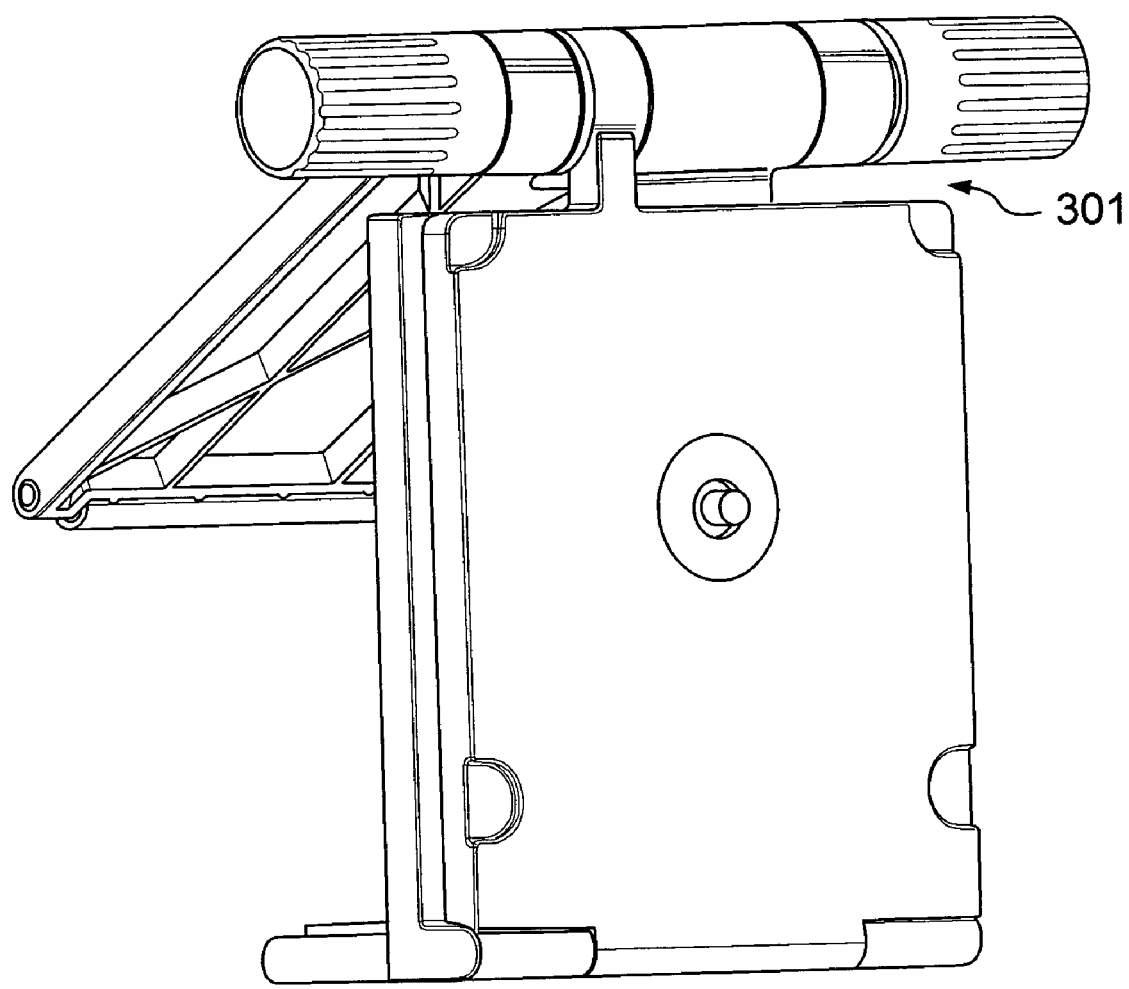
FIG. 3 illustrates a top view of the camera support mechanism with a cable slot, according to an embodiment.

In various embodiments, the back of the CSM 101 may have a slot 301 (as seen in FIG. 3) in front of the adjustment knobs that may be used to route a camera cable without increasing the overall depth of the CSM 101 by having the camera cable wrap around the back of the CSM 101. Other locations for the slot 301 are also contemplated. In some embodiments, the electronics from the camera in the video conferencing system may be split in order to use a smaller mount for fitting the camera on top of the display device.

Figure 4:
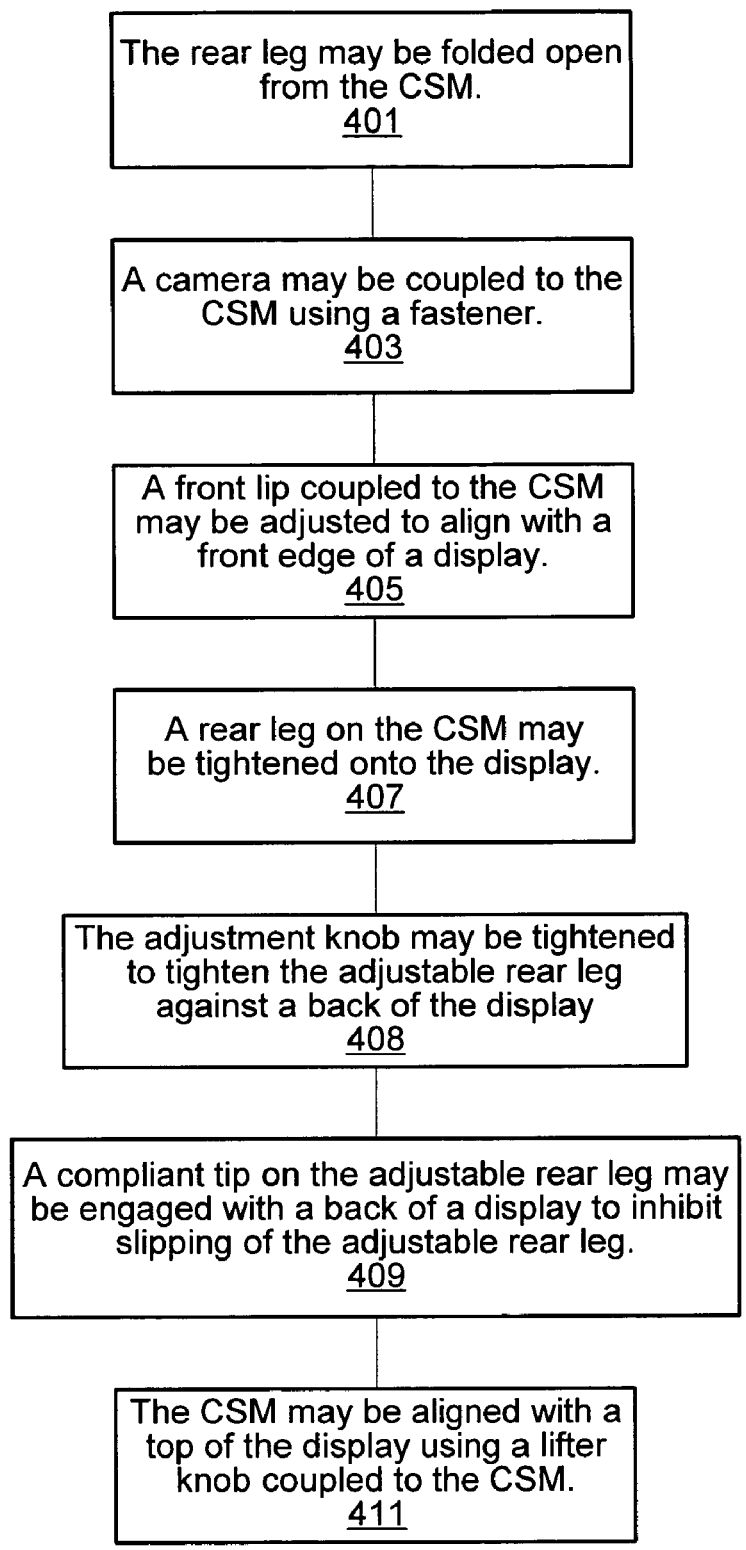
FIG. 4 illustrates a method for mounting a camera to a display using the camera support mechanism, according to an embodiment.

FIG. 4 illustrates an embodiment of a method for mounting a camera to a display using the CSM 101. It is noted that in various embodiments one or more of the method elements may be performed concurrently, in a different order, or be omitted. Additional elements may be performed as desired.

At 401, the rear leg 111 may be folded open from the CSM 101. In some embodiments, the rear leg 111 may originally be folded on top or on the bottom of the CSM 101 to make the CSM more compact when not in use.

At 403, a camera may be coupled to the CSM 101 using a fastener. For example, the camera may be coupled to the CSM 101 with a tripod mount screw 115. In some embodiments, the upper deck may be pivoted open to access the tripod mount screw 115. In some embodiments, other fasteners may be used (e.g., the camera may be mounted to the CSM through adhesive or the CSM may be built into the camera).

At 405, a front lip 105 coupled to the CSM 101 may be adjusted to abut a front edge of a display. For example, if the display is a flat screen display mounted to a wall, the front lip 105 may be mounted toward the center of the CSM 101 to reduce the amount of space need behind the display for the rear leg 111 and pivot assembly 109.

At 407, a rear leg 111 on the CSM 101 may be tightened onto the rear of the display. At 408, the adjustment knob 109 may be tightened to tighten the adjustable rear leg 111 against a back of the display. The tightening of the adjustment knob 109 may apply a tightening force once the rear leg 111 makes contact with the back of the display. In some embodiments, a motor may tighten the CSM 101 onto the display. In some embodiments, the front lip 105 and rear leg 111 may secure the CSM 101 to the display. A compliant tip 117 on the adjustable rear leg 111 may engage the back of a display to inhibit slipping of the adjustable rear leg 111. In some embodiments, a substantially similar user interaction with the adjustment knob (e.g., turning the adjustment knob in the same direction) may rotate the adjustable rear leg, tighten the adjustable rear leg onto the display, and lock the adjustable rear leg onto the display. Other substantially similar user interactions are also contemplated (e.g., pressing a button to activate a motor to tighten the adjustable rear leg).

At 409, a compliant tip on the adjustable rear leg may be engaged with a back of a display to inhibit slipping of the adjustable rear leg.

At 411, the CSM 101 may be aligned with a top of the display using a lifter knob 201 coupled to the CSM 101.

Figure 5:
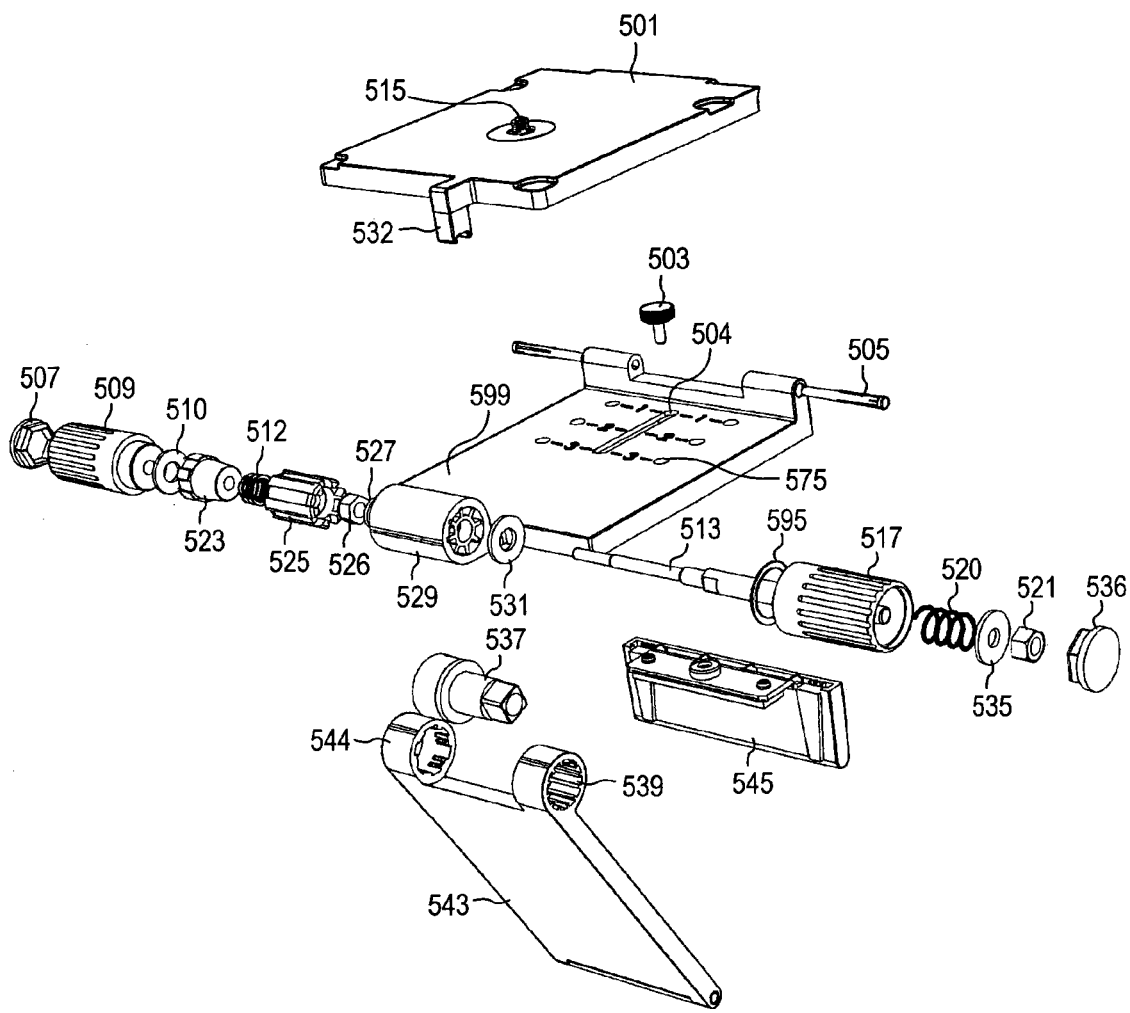
FIG. 5 illustrates an exploded view of another embodiment of a camera support mechanism, according to an embodiment.

FIG. 5 illustrates an exploded view of another embodiment of the CSM. FIG. 6 illustrates a cross sectional view of the embodiment of the CSM shown in FIG. 5. FIGS. 5 and 6 illustrate various different embodiments of configurations for different components within the CSM. For example, the rear leg securing assembly (as further seen in FIG. 7) and upper deck adjustment assembly may have different configurations.

Figure 7:
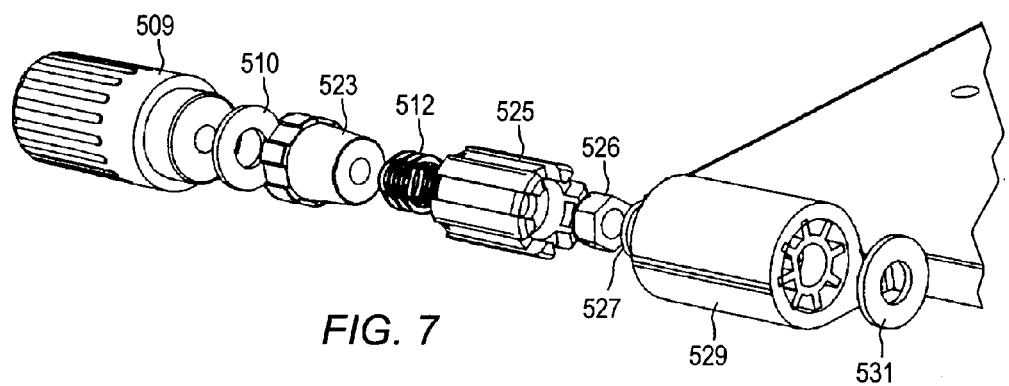
FIG. 7 illustrates an exploded view of rear leg securing assembly, according to an embodiment.

FIGS. 5-7 illustrate an embodiment of an exploded view of a rear leg securing assembly. In some embodiments, as the adjustment knob 509 is twisted, it may screw onto a threaded rod 513. In some embodiments, the tapered member 523 has offset features on its outer surface that engage with offset features on the inner edge of the upper adjustable rear leg housing 544. Similarly, the barrel 525 may have offset features on its outer surface that engage with offset features on the inside surface of the lower deck 529. As the adjustment knob 509 is twisted it may engage the rubber washer 510, which, in turn, may rotate the tapered member 523. The rotation may result in the rear leg 543 rotating until the rear leg 543 comes into contact with the back of the display, at which point the rear leg 543 may stop rotating, as does the tapered member 523 (which is engaged with the rear leg 543). Further twisting of the knob 509 may cause the tapered member 523 to drive into engagement with the barrel 525, substantially locking the two together and therefore locking the rear leg 543 position with respect to the lower deck 529. As seen in FIG. 6*b*, a motor 699 may perform the described functions of the adjustment knob 509. For example, a motor 699 may be activated by a button to engage the rubber washer and rotate the tapered member 523.

In another embodiment, as the adjustment knob 509 is twisted, the adjustment knob 509 may engage a rubber washer 510 that may in turn twist the tapered member 523. The tapered member 523 may engage barrel 525 through friction between the sides of the tapered member 523 and the barrel 525. The barrel 525 may engage and rotate the rear leg 543 through the offset outer edges of the barrel engaging the offset inner edge of the upper adjustable rear leg housing 544. After the rear leg 543 comes to rest against the back of a display and stops rotating, the barrel 525 may stop rotating relative to the tapered member 523. In some embodiments, the friction between the adjustment knob 509 and the rubber washer 510 may not be sufficient to turn the rubber washer and/or tapered member 523 once the rear leg 543 has made contact with the back of the display. In some embodiments, the friction between the tapered member 523 and the barrel 525 may not be sufficient to turn the barrel 525 relative to the tapered member 523. As the adjustment knob 509 continues to turn, the tapered member 523 may be forced inward against the barrel 525 increasing the friction between the sides of the tapered member 523 and the barrel 525. The increased friction may result in a better hold on the rear leg 543.

In some embodiments, the front lip 545 may be continuously adjustable on the lower deck 599 through screw 503 and slot 504. In some embodiments, guide markings 575 may be provided to guide the placement of the front lip 545. Placement holes may be provided to give additional support to the front lip at certain locations along the slot (e.g., other fasteners may be used with the additional holes). In some embodiments, placement holes may also be used for more specific placements of the upper deck in place of the slot. The adjustable front lip 545 may be adjusted for the thickness of the display the camera is to be mounted on.

Figure 8:
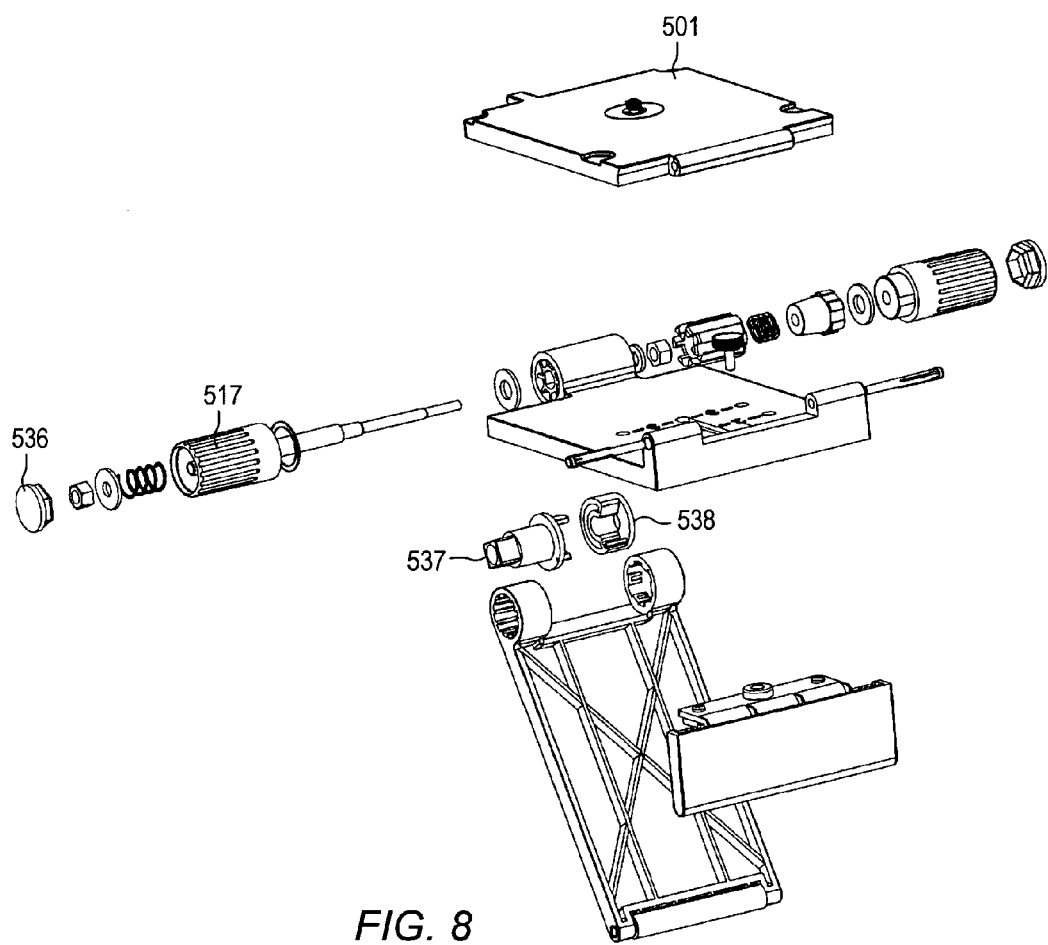
FIG. 8 illustrates an exploded view of an upper deck adjustment assembly, according to an embodiment.

FIGS. 8 and 9 illustrate various views of the upper deck leveler, according to an embodiment.

In some embodiments, the lifter insert 537 and the lifter nut 538 are bonded together and act as one part. The spring 520 may load the lifter insert/nut 537/538 against the friction washer 531 which in turn is loaded against the lower deck 599. This may provide friction to support the weight of the upper deck 501 and camera.

Figure 9A:
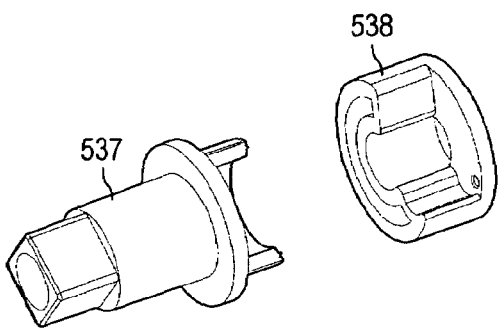
FIGS. 9a-9c illustrate various views of the upper deck adjustment assembly, according to an embodiment.
Figure 9B:
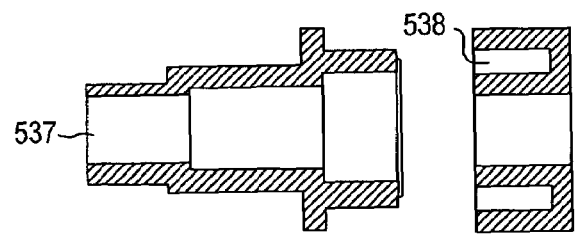
Figure 9C:
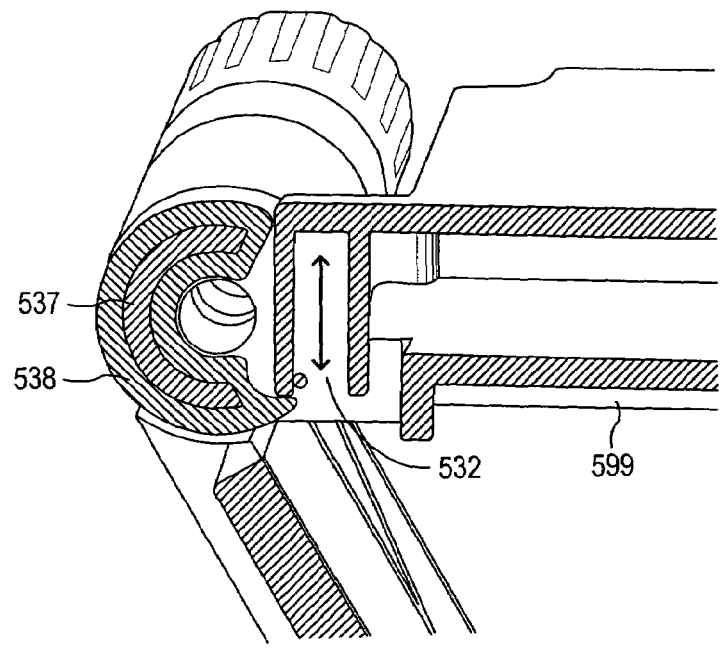

In another embodiment, as the lifter knob 517/washer 595 is turned, a lifter insert 537 may rotate inside of a lifter nut 538 configured to lift (or lower) the upper deck 501 by applying an upward force on the upper deck extension tab 532. As seen in FIGS. 9*a* and 9*b*, the lifter insert 537 may fit inside the lifter nut 538 to engage the lifter nut 538 and turn it. In some embodiments, a lip of the lifter nut 538 may engage the upper deck extension tab 532 to lift or lower it. In some embodiments, spring 520 may apply pressure to the lifter insert 537 to keep it in contact with the lifter nut 538. FIG. 9*c* is a cross sectional view illustrating an embodiment of how the lifter nut 538 may engage the upper deck extension tab 532 to lift or lower the upper deck 501.

FIGS. 10a-10c illustrate various configurations for the camera support mechanism on different display types, according to an embodiment. FIG. 10a illustrates a configuration for the CSM supporting a camera 1011 on top of a flat screen display 1001. The rear leg 543 may be in contact with the back of the display 1001. The rear leg 543 together with the front lip 545 may secure the camera 1011 to the top of the display. In some embodiments, the upper deck 501 may be adjustable to slant the camera 1011 relative to the CSM. FIG. 10b illustrates an embodiment of a CSM supporting a camera 1011 on a display 1003 with a contour back. The rear leg 543 may be at a greater angle relative to the rest of the CSM because the rear leg 543 may make contact with the contour of the back of the display at a greater angle than if the CSM was mounting to a flat screen display.

FIG. 10c illustrates an embodiment of the CSM with an adjusted front lip. In some embodiments, the front lip 545 may be adjusted forward (e.g., by moving a fastener in a slot as discussed above). Bringing the front lip 545 forward may bring the rear leg 543 and rear leg securing assembly 1051 closer to the rear of the display 1005. This may allow the CSM to be used on a flat screen display that is mounted to a wall. If mounted to a wall, there may be less space available for the rear leg 543 and rear leg securing assembly 1051 behind the display 1005.

Embodiments of these methods may be implemented by program instructions stored in a memory medium or carrier medium. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus, comprising:
   a mount;
   a front lip, coupled to the mount, wherein the front lip is configured to abut an edge of a display when the mount is coupled to the display; and
   an adjustable rear leg coupled to the mount, wherein the adjustable rear leg is configured to tighten onto the display to hold the mount on the display;
   wherein tightening the adjustable rear leg comprises reducing a straight-line distance between a display-engaging end of the adjustable rear leg and the mount and wherein a force applied on the display by the adjustable rear leg is user adjustable.

2. The apparatus of claim 1,
   wherein the mount is configured to couple to a camera;
   wherein the front lip is adjustable relative to the mount; and
   wherein adjusting the front lip comprises changing a straight-line distance between the front lip and the portion of the mount coupled to the camera.

3. The apparatus of claim 1, further comprising an adjustment knob configured to rotate the adjustable rear leg, tighten the adjustable rear leg onto the display, and lock the adjustable rear leg onto the display with a substantially similar user interaction with the adjustment knob.

4. The apparatus of claim 1, wherein the adjustable rear leg is adjustable by a rear leg securing assembly coupled to the mount, wherein the rear leg securing assembly comprises:
   a rotatable knob;
   a washer;
   a tapered member; wherein the tapered member and the rotatable knob are in contact with the washer and wherein rotating the knob rotates the washer and the tapered member;
   a barrel, wherein the barrel receives the tapered member; and
   a threaded rod coupled to the rotatable knob, wherein when the rotatable knob is rotated, the washer and tapered member are pressed toward the barrel;
   wherein the tapered member is coupled to and rotates the rear leg as the rotatable knob rotates until the rear leg contacts the display;
   wherein when the rear leg contacts the display, the tapered member tightens against the barrel as the rotatable knob is rotated to further secure the rear leg.

5. The apparatus of claim 1, wherein the mount comprises an upper deck and a lower deck, and wherein the upper deck is adjustable, relative to the lower deck, by a lifter knob coupled to the mount.

6. The apparatus of claim 1, wherein the front lip and the adjustable rear leg are moveable relative to the mount and to each other.

7. The apparatus of claim 1, wherein the mount comprises a lower deck and an upper deck, and wherein the upper deck is operable to be lifted relative to the lower deck.

8. A system, comprising:
   a mount means;
   a fastener means to couple a camera to the mount means;
   an adjustable front lip means, coupled to the mount means, wherein the adjustable front lip means is configured to be adjusted on the mount means; and an adjustable rear leg means coupled to the mount means, wherein the adjustable rear leg means is configured to tighten onto a display to hold the mount means on the display;

wherein adjusting the front lip means comprises changing a straight-line distance between a portion of the front lip means configured to engage an edge of the display and the fastener means.

9. The system of claim 8, wherein the adjustable rear leg means is configured to fold open from the mount means.

10. The system of claim 8, wherein the adjustable rear leg means further comprises a tip means, wherein the tip means is configured to engage a back of the display to inhibit slipping of the adjustable rear leg means.

11. The system of claim 8, further comprising a motor coupled to the adjustable rear leg means, wherein the motor is configured to tighten the adjustable rear leg means against a back of the display.

12. The system of claim 8, further comprising a lifter knob means, wherein the lifter knob means is configured to align the mount means with a top of the display.

13. The apparatus of claim 8, wherein the adjustable rear leg means is adjustable by a rear leg means securing assembly coupled to the mount, wherein the rear leg means securing assembly comprises:
   a rotatable knob;
   a washer;
   a tapered member; wherein the tapered member and the rotatable knob are in contact with the washer and wherein rotating the knob rotates the washer and the tapered member;
   a barrel, wherein the barrel receives the tapered member; and
   a threaded rod coupled to the rotatable knob, wherein when the rotatable knob is rotated, the washer and tapered member are pressed toward the barrel;
   wherein the tapered member is coupled to and rotates the rear leg means as the rotatable knob rotates until the rear leg means contacts the display;
   wherein when the rear leg means contacts the display, the tapered member tightens against the barrel as the rotatable knob is rotated to further secure the rear leg means.

14. The apparatus of claim 8, wherein the mount means comprises an upper deck and a lower deck, and wherein the upper deck is adjustable, relative to the lower deck, by a lifter knob coupled to the mount.

15. The apparatus of claim 8, wherein adjusting the front lip means comprises moving the front lip means relative to the mount means and the adjustable rear leg means.

16. A method, comprising:
   coupling a camera to a mount using a fastener;
   adjusting a front lip coupled to the mount, wherein the front lip is configured to abut an edge of a display, wherein adjusting the front lip comprises changing a straight-line distance between a portion of the front lip configured to engage the edge of the display and the fastener; and
   adjusting a rear leg on the mount to tighten onto the display, wherein the front lip and the rear leg secure the mount to the display.

17. The method of claim 16, further comprising folding open the rear leg from the mount.

18. The method of claim 16, further comprising tightening an adjustment knob to tighten the adjustable rear leg against a back of the display.

19. The method of claim 16, further comprising engaging a compliant tip on the adjustable rear leg with a back of the display to inhibit slipping of the adjustable rear leg.

20. The method of claim 16, wherein adjusting the front lip comprises moving the front lip relative to the mount and the rear leg.

* * * * *

UNITED STATES PATENT AND TRADEMARK OFFICE
CERTIFICATE OF CORRECTION

PATENT NO. : 7,572,073 B2  Page 1 of 1
APPLICATION NO. : 11/252222
DATED : August 11, 2009
INVENTOR(S) : Kenoyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this

Seventh Day of September, 2010

David J. Kappos
*Director of the United States Patent and Trademark Office*